Patented Jan. 11, 1949

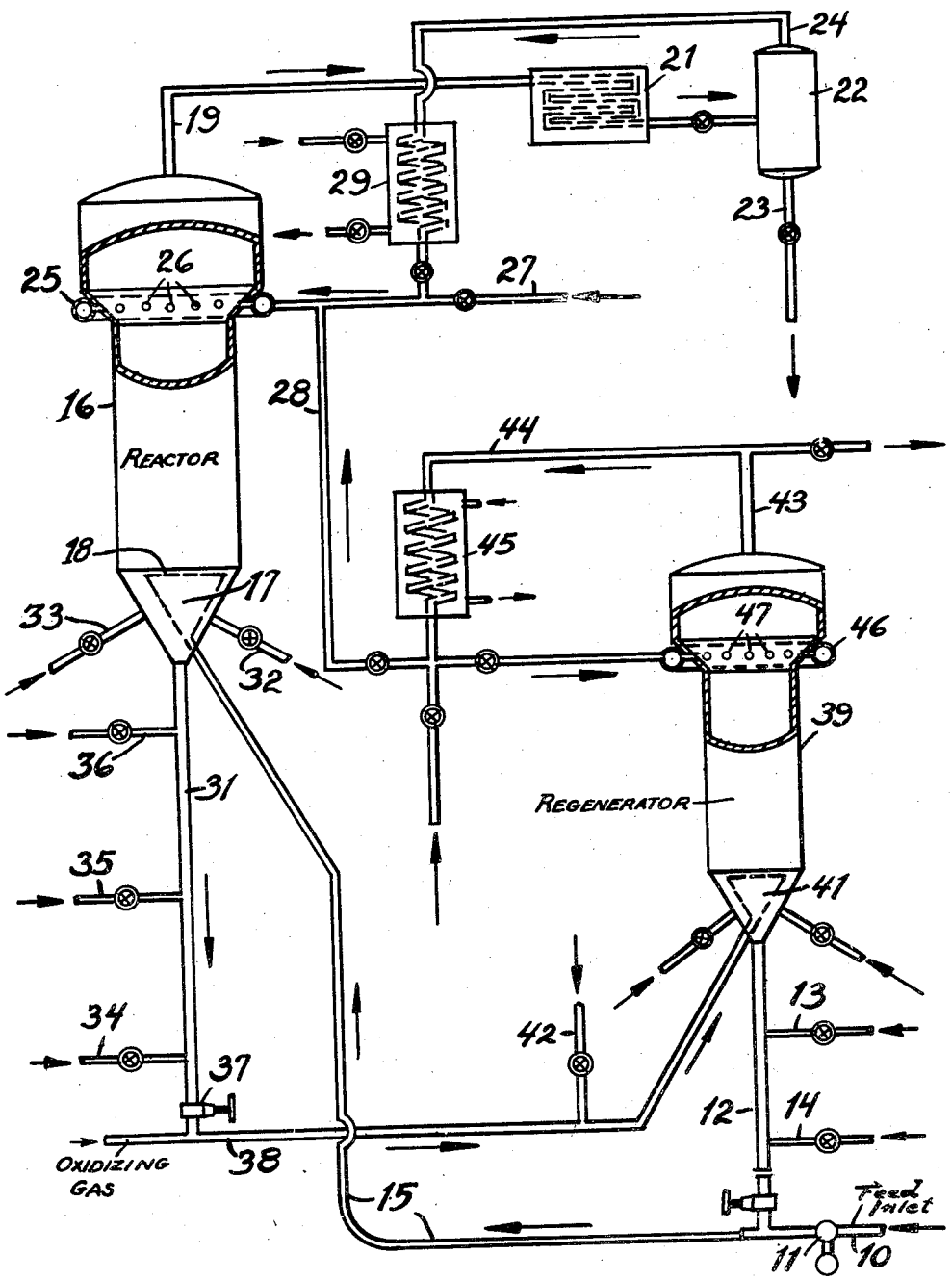

2,458,862

UNITED STATES PATENT OFFICE 2,458,862

PREVENTING SECONDARY REACTIONS IN CATALYTIC PROCESSES

Robert W. Krebs, Baton Rouge, La., assignor to Standard Oil Development Company, a corporation of Delaware Application July 24, 1943, Serial No. 496,014

3 Claims. (Cl. 260—683.3)

1

This invention relates to a process for carrying out reactions in gaseous or vapor phase at elevated temperatures in the presence of finely divided solid catalytic material and pertains more particularly to a method of avoiding undesirable side reactions following the main reaction.

It has heretofore been proposed to carry out gaseous or vapor phase reactions in the presence of a finely divided catalytic material. It has been found that by passing a gas or vapor to be reacted upwardly through an elongated reaction chamber containing a mass of finely divided solid catalytic material at a relatively low velocity and controlled with respect to the viscosity and density of the gas and the size and density of the catalyst particles, a relatively dense turbulent layer of the finely divided catalytic material may be maintained in the bottom portion of the reaction chamber. This layer will be overlain by a layer of gaseous reaction products containing a relatively small amount of the finely divided catalyst as compared with the amount contained in the lower layer. The depth of the dense turbulent layer of catalytic material may be controlled by regulating the amount of catalytic material maintained in the reaction chamber.

In order to reduce the amount of entrained finely divided catalytic material in the gaseous reaction products leaving the reaction chamber, it is desirable to hold the level of the dense turbulent layer of catalytic material a substantial distance below the outlet for the gaseous products. For example, in carrying out catalytic processes in which the catalyst employed has a particle size of the order of 200 mesh or finer, the level of the dense turbulent mass should be of the order of from 5 to 25 feet below the outlet of the reaction products.

While the provision of such a large free space above the dense layer is desirable for cutting down entrainment, in some types of processes it it objectionable because it allows additional time for undesirable side reactions to occur.

The principal object of the present invention is to provide a process for carrying out gas phase reactions as above described which will not be subject to the objection just mentioned.

The invention in its more specific phase finds particular application in fluid catalyst processes in which finely divided catalytic material maintained in a fluid state is caused to circulate continuously through the reaction chamber and the bulk of the catalytic material is separately withdrawn independently of the reaction products

2 from the dense fluidized layer of catalytic material maintained within the reaction zone.

For example, within the past year plants have been constructed for cracking oils in which finely divided cracking catalysts have been forced into a stream of oil at a controlled rate by a fluid pressure generated by a vertical column of said finely divided catalytic material maintained in a fluid state by injecting a small amount of an aerating gas into the column.

The stream of oil following the addition of the catalyst is passed into the bottom portion of a vertical cracking chamber through which the oil vapors undergoing cracking pass upwardly at a velocity controlled to effect primary settling of the finely divided catalytic material into a dense turbulent layer within the bottom portion of the cracking chamber.

The cracked vapors after passing through the cracking chamber are removed overhead and passed to suitable fractionating equipment for segregation of the final product.

The catalytic material is continuously removed from a point below the level of the dense turbulent layer within the cracking zone at a controlled rate to maintain the upper level of the layer at a substantial distance below the outlet for the cracked vapor product.

The catalyst removed from the reaction chamber is first treated to remove the oil vapors absorbed thereon and then discharged into the top of a second column or standpipe wherein sufficient additional pressure is generated to force the spent catalyst into a stream of air which carries it into the bottom portion of a regeneration chamber wherein coke or carbonaceous deposits formed on the catalytic material during the cracking process are burned therefrom.

The air is caused to pass upwardly through the regeneration zone at a controlled velocity which will effect a segregation of a dense turbulent layer of catalyst undergoing regeneration within the regeneration zone, as previously described in connection with the cracking zone. The spent combustion gases containing a small amount of entrained catalyst are removed from the upper portion of the regeneration zone and may be passed to additional separators or purifiers before being vented to the atmosphere. The regenerated catalyst is continuously removed from the lower portion of the regeneration chamber below the level of the dense turbulent layer therein and is passed to the top of the first-named column or standpipe for return to the oil stream. When operating in this manner it sometimes happens that a secondary combustion takes place in the free space above the dense turbulent layer in the regeneration zone. This secondary combustion may cause excessive heating of the catalytic material entrained in the gases with the resultant impairment of the catalyst activity.

In accordance with one phase of the present invention such secondary combustion is prevented by introducing a quenching gas at spaced points immediately above the dense turbulent layer of catalytic material. The amount of quenching gas introduced should be sufficient to cool the reaction gases to such a temperature that undesirable side reactions are avoided.

The size of the reaction and regeneration zone at the point of entry of the quenching gas should be such that the resulting velocity of the combined stream of gas is insufficient to entrain additional finely divided catalyst in the exit gas.

The quenching gas is preferably a relatively inert gas such as a gas formed in the process, steam, spent regeneration or combustion gas, nitrogen, or the like.

With the above general nature and object in view, the invention will be better understood by reference to the accompanying drawing which is a diagrammatic illustration of an apparatus capable of carrying the invention into effect. The invention will be described as applied to the dehydrogenation of butane and butene, it being understood that it will have other more general applications as above set forth.

Referring to the drawing, the reference character 10 designates a feed line into which the feed to be reacted is introduced. In the case illustrated the feed may comprise a normal butane fraction which is to be dehydrogenated into butenes for subsequent use either for the preparation of aviation gasoline or for the production of synthetic rubber. The butane introduced into line 10 is passed to compressor 11 in which the stream is placed under the desired pressure for carrying out the dehydrogenation reaction. After passing through the compressor 11, there is introduced into the stream of butane through a vertical column or standpipe 12 a finely divided dehydrogenating catalyst. Such a catalyst may comprise, for example, a group VI oxide and particularly chromium oxide or molybdenum oxide supported on a suitable carrier such as activated alumina.

The catalyst is preferably in a finely divided form having a particle size smaller than 200 mesh. The amount of catalytic material introduced into the stream may be controlled by a valve in standpipe 12. The amount may, for example, range from 0.5 to 20 parts by weight of catalyst per part of feed.

The column or standpipe 12 should be of a height sufficient to generate pressure at the bottom thereof at least equal to the pressure on the feed at the point of entry of the catalyst therein. In order to generate the desired pressure at the base of the column the catalyst within said column should be maintained in a fluid state. This may be accomplished by keeping a small amount of an aerating gas in admixture with the catalyst during its passage through the column. To this end a smaller amount of gas may be introduced at one or more points along the column through lines 13 and 14.

The suspension of butane and catalyst is passed through line 15 into the bottom portion of a dehydrogenation chamber 16. The resulting suspension is preferably introduced into the chamber 16 through a distributing cone 17 having a perforated grid 18 at the top thereof to distribute the suspension uniformly over the full cross-sectional area of the chamber.

The distributing cone 17 is preferably spaced from the outer wall of the reaction chamber to provide an annular space for the removal of catalyst from the reaction chamber.

The velocity of the butane passing upwardly through the reaction chamber is materially reduced upon introduction into the reaction chamber and the upward velocity of the gases passing through the reaction chamber is controlled to permit the finely divided catalyst material to settle or segregate into a dense turbulent layer, as previously described. To this end the velocity of the gas may be of the order of from 0.5 to 2 feet per second, depending upon the size and density of the catalyst particles. Under properly controlled conditions a relatively dense layer is formed having a fairly sharp upper level above which a relatively dilute layer of gases containing a small amount of entrained catalytic material is maintained. The catalyst is withdrawn from the reaction chamber at a controlled rate sufficient to hold the level of the dense turbulent layer of catalytic material a substantial distance below the upper end of the reaction chamber.

The temperature maintained within the reaction chamber may be of the order of from 800° F. to 1200° F. and the depth of the layer is controlled to provide the desired time of contact between the gas and catalytic material. The gaseous reaction products after passing through the reaction chamber 16 are removed overhead through line 19. The gaseous reaction products removed through line 19 may be passed to a condenser 21 in which the products are cooled to a temperature sufficient to condense the butane-butene constituents. Products from condenser 21 may then pass to a product receiver 22 in which lower boiling gaseous hydrocarbons and hydrogen formed during the reaction may be segregated from the liquid condensate consisting primarily of butenes and unreacted butanes. The condensate is removed from the product receiver 22 through line 23 and may be passed to an alkylation unit wherein it is combined with isobutane to form aviation alkylate, or it may be subjected to further dehydrogenation for conversion into butadiene. Uncondensed gases are removed from the product receiver 22 through line 24.

In accordance with the present invention, there is injected into the gaseous products in the upper portion of the reaction chamber 16 above the dense layer a relatively cool gas in an amount sufficient to reduce the temperature of the reaction products and avoid undesirable side reactions in the upper zone of the reaction chamber. The cooling gas may be introduced at spaced points around the circumference of the reaction chamber through a bustle pipe 25 having a series of branch lines 26 leading into the upper portion of the reaction chamber. The bustle pipe 25 is preferably positioned immediately above the dense turbulent layer of catalytic material within the reaction chamber. The upper portion of the reaction chamber may have a diameter greater than the diameter of the main body of the reaction chamber as illustrated in the drawing so that the introduction of the quenching gas will not materially increase the velocity of the gas passing through the reaction chamber. The gas introduced into the bustle pipe 25 may be an inert gas such as steam introduced through line 27 or a spent regeneration or combustion gas introduced through line 28. As a further alternative a part or all of the lower boiling gaseous material formed during the operation and withdrawn from the product receiver 22 through line 24 may be passed through a suitable heat exchanger 29 and then used for quenching the reaction products immediately above the catalyst layer within the reaction chamber.

The bottom portion of the reaction chamber 16 communicates with the upper end of a standpipe or column 31 into which catalytic material from the reaction chamber is continuously charged through the annular space surrounding the distributing cone 17. In order to remove absorbed reaction gases from the catalyst prior to removal therefrom it is desirable to introduce a stripping or purging gas at one or more spaced points into the bottom section of the reaction chamber through lines 32 and 33.

A small amount of a fluidizing gas is preferably introduced into standpipe 31 at one or more spaced points through lines 34, 35 and 36 to maintain the catalyst within the column in a fluidized state capable of generating a fluid pressure at the base thereof. The height of the column 31 should be sufficient to generate a pressure therein which will overcome the pressure drop through the regeneration zone, as later described.

The catalytic material is withdrawn from the bottom of the column 31 through a control valve 37 and discharged into a stream of oxidizing gas passing through line 38. The resulting mixture of oxidizing gas and catalyst is then passed into the bottom section of a regeneration chamber 39 which is of the same construction as the reaction chamber 16 previously described. For example, the suspension of catalyst and oxidizing gas is introduced into the regeneration chamber 39 through distributing cone 41 which is spaced from the outer wall of the regeneration chamber to permit withdrawal of regenerated catalyst into the column or standpipe 12.

The velocity of the oxidizing gas passing upwardly through the regeneration zone is also controlled to permit the catalyst to segregate into a dense layer in the bottom portion of the zone which is maintained in a turbulent condition by the upward passage of the gas therethrough.

The catalytic material during its passage through the regeneration zone is subjected to oxidation to remove combustible deposits formed thereon during the reaction. The burning of such combustible deposits will result in the liberation of heat which may be absorbed by the catalyst material and utilized for carrying out the dehydrogenation reaction. In cases where the combustible deposits formed are relatively small, additional fuel such as a gas oil may be burned in the regeneration zone to heat the catalyst therein. Such a fuel may be introduced into line 38 through line 42.

The spent combustion gases after passing through the layer of catalytic material within the regeneration zone 39 are removed overhead through line 43. These gases may be passed to suitable equipment such as cyclone separators, electrical precipitators, or the like (not shown) for removal of entrained catalyst therefrom and thereafter vented to the atmosphere.

A desired portion of the spent combustion gas with or without first removing entrained catalyst may be passed through line 44 to a cooler 45 where it is cooled to temperatures materially below the reaction and regeneration temperature and the cooled combustion gas may thereafter be used as a quenching gas for the reactor or regenerator, or both.

In order to avoid the possibility of secondary combustions taking place in the upper section of the regeneration zone 39, a quenching gas may be introduced directly above the catalyst layer through a bustle pipe 46 having branch lines 47 leading into the regeneration chamber.

As previously described with respect to the reaction chamber 16, the upper portion of the regeneration chamber may also be enlarged so that the introduction of the quenching gas will not materially increase the velocity of the gases passing through the vapor space.

While the invention has been described with specific reference to the dehydrogenation of butane, it also has application to other reactions in which it is desirable to avoid subsequent secondary reactions from taking place following the separation of the catalyst from the reaction products. It may be employed, for example, in the catalytic cracking of hydrocarbon oils and in the dehydrogenation of butenes to form butadiene.

Having described the preferred embodiment of the invention, it will be understood that it embraces such other variations and modifications as come within the scope of the accompanying claims.

What is desired to be protected by Letters Patent is:

1. In a process for carrying out gas phase reactions at elevated temperatures in the presence of finely divided catalytic material wherein the gas to be reacted is passed upwardly through a reaction zone containing a layer of finely divided catalytic material in dense, turbulent condition, overlain by a space above said layer containing a relatively small amount of catalyst; the method of preventing undesirable secondary reactions during passage of the reaction products through said space which comprises injecting an inert quenching gas into said space in an amount sufficient to reduce the temperature of the reaction gases passing therethrough below a temperature which will cause such secondary reactions, separating a portion of the mixture of quenching gas and reaction gases, cooling the separated gas and returning this cooled gas to the space above the dense turbulent layer of finely divided catalytic material as the inert quenching gas.

2. Process according to claim 1, in which the gas phase reaction is the dehydrogenation of low-boiling hydrocarbons to form light, unsaturated hydrocarbons.

3. The process for regenerating finely divided solid material containing combustible deposits which comprises passing an oxidizing gas upwardly through a regeneration zone containing said finely divided solid material at a controlled rate to maintain a dense turbulent layer of said finely divided solid material in the bottom portion of said regeneration zone, maintaining the temperature within the regeneration zone sufficient to burn said combustible deposits, injecting a cooling gas into the stream of regeneration gas, associated with minor amounts of solid material containing combustible deposits, leaving said layer of finely divided catalyst to materially reduce the temperature thereof and avoid secondary combustion above said catalyst layer, withdrawing gaseous material from said regeneration zone, cooling a portion of this gaseous material and returning the cooled gaseous material to the regeneration zone as the cooling gas which is injected into said stream of regeneration gas.

ROBERT W. KREBS.

REFERENCES CITED

The following references are of record in the file of this patent:

UNITED STATES PATENTS

| Number | Name | Date |
|---|---|---|
| 677,670 | Krauss et al. | July 2, 1901 |
| 1,955,297 | Jennings | Apr. 17, 1934 |
| 2,093,588 | Forward | Sept. 21, 1937 |
| 2,300,151 | Hemminger | Oct. 27, 1942 |
| 2,304,128 | Thomas | Dec. 8, 1942 |
| 2,320,562 | Bransky | June 1, 1943 |
| 2,327,175 | Conn | Aug. 17, 1943 |
| 2,347,682 | Gunness | May 2, 1944 |
| 2,348,009 | Johnson et al. | May 2, 1944 |
| 2,356,680 | Marancik et al. | Aug. 22, 1944 |
| 2,356,697 | Rial | Aug. 22, 1944 |
| 2,391,160 | Hillman et al. | Dec. 18, 1945 |
| 2,409,780 | Mekler | Oct. 22, 1946 |
| 2,424,467 | Johnson | July 22, 1947 |

FOREIGN PATENTS

| Number | Country | Date |
|---|---|---|
| 297,231 | Great Britain | Sept. 20, 1928 |
| 463,244 | Great Britain | Mar. 24, 1937 |
| 543,838 | Great Britain | Mar. 16, 1942 |